United States Patent [19]

Levesque

[11] 4,088,163

[45] May 9, 1978

[54] TREE SHEARING DEVICE

[76] Inventor: Lucien Levesque, 3100 Carling Ave., Apt. 1106, Ottawa, Ontario, Canada

[21] Appl. No.: 712,218

[22] Filed: Aug. 6, 1976

[30] Foreign Application Priority Data

Aug. 6, 1975 Canada .................................. 232902

[51] Int. Cl.² ............................................ A01G 23/08
[52] U.S. Cl. .................................. 144/34 E; 37/2 R;
   144/3 D
[58] Field of Search ................... 144/3 D, 2 Z, 34 R,
   144/34 E, 309 AC; 37/2 R

[56] References Cited

U.S. PATENT DOCUMENTS

| | | | |
|---|---|---|---|
| 3,461,929 | 8/1969 | Hunger et al. ..................... | 144/34 R |
| 3,817,303 | 6/1974 | Kantola et al. .................... | 144/34 R |
| 3,826,295 | 7/1974 | Johnson et al. ................... | 144/34 E |
| 3,865,168 | 2/1975 | McColl .............................. | 144/3 D |

*Primary Examiner*—Othell M. Simpson
*Assistant Examiner*—W. D. Bray
*Attorney, Agent, or Firm*—Stevens, Davis, Miller & Mosher

[57] ABSTRACT

A tree shearing apparatus is provided which cuts virtually all of the wood fibers at an oblique angle thereto thus reducing power requirements by improving the shearing action. Upward compression and/or splitting forces on the trunk are very significantly reduced as compared with the prior art devices and provision is made for a major portion of the compressive forces to be transmitted downwardly to the stump. An increased recovery of usable wood may also be realized by virtue of the use of the present invention. The tree shearing apparatus includes a support means adapted to be positioned adjacent the trunk of a standing tree. The apparatus includes first and second cutter blades each having a cutting edge mounted to the support means, with the cutter blades projecting generally forwardly from the support means. Means are provided for mounting the cutter blades for motion of their cutting edges along curved paths from elevated positions where the cutting edges are spaced from one another to lower positions where the cutting edges are closely adjacent to one another thereby to perform a tree-cutting operation. The apparatus also includes actuating means for effecting the above noted movement of the cutter blades.

10 Claims, 8 Drawing Figures

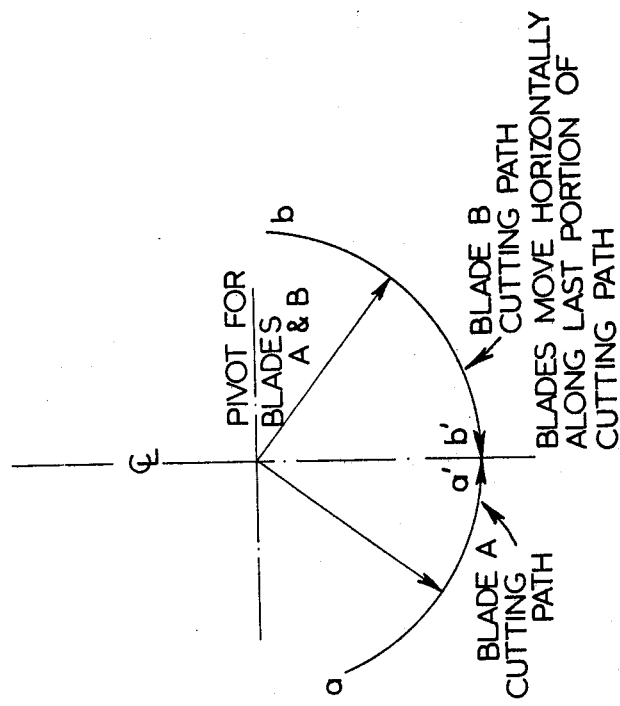
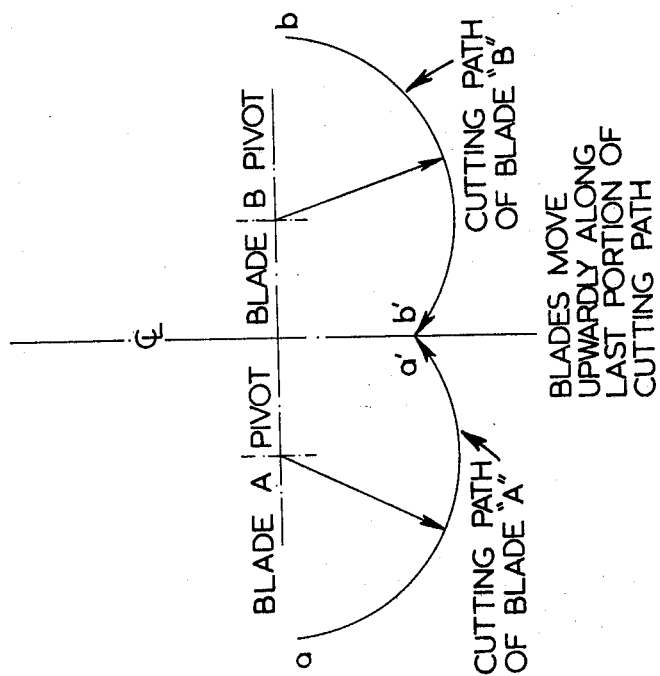

TREE SHEARING DEVICE

This invention relates generally to shear apparatus for severing standing trees from their rooted stumps at a location closely adjacent the ground. More particularly, the invention relates to shear apparatus having cutting edges that travel in arcuate paths generally towards one another whereby to sever the fibers of the tree while effecting minimal damage to the tree trunk.

Shearing apparatus of the general nature described above is known in the art as, for example, from U.S. Pat. No. 3,461,929 issued Aug. 16, 1969 which apparatus includes a pair of opposed cutting blades each mounted on its own shaft with the shafts being spaced horizontally. The cutting blades are in the form of cylindrical segments. In the particular arrangement described in this patent, the cutting edges of the blades enter opposing sides of the tree trunk and move along circular paths towards each other, firstly generally downwardly, then somewhat horizontally, and then slightly upwardly until the tree has been severed from the rooted stump. Since the blades are compelled to move almost horizontally for a substantial distance, many of the wood fibers are sheared at almost right angles thereto thus increasing the power requirements for the shear head and increasing the possibility of crushing and damaging the wood fibers adjacent the paths of cut. Furthermore, owing to the thickness of the blades and the upward motion of same during the final cutting stage, there is a tendency for splitting forces to be transmitted to the tree trunk. In addition, an appreciable amount of useable wood material is left in the stump and is thus wasted.

The above noted U.S. Pat. No. 3,461,929 provides for the mounting of the blades on a pair of spaced apart axes, one turning axis and its associated blade being located to one side of the vertical center line of the apparatus, and the other turning axis and its associated blade being located to the opposite side of the vertical center line of the apparatus. In an effort to eliminate some of the disadvantages associated with the spaced-apart rotation axes for the blades, arrangements have been devised wherein the two opposed blades are mounted for rotation on a common axis located on the vertical center line of the shear head. Arrangements such as this are shown in U.S. Pat. Nos. 3,817,303 issued June 18, 1974 and 3,862,652 issued Jan. 28, 1975. This form of mounting arrangement substantially eliminates the upward motion of the cutting edges during the final cutting stages and reduces the danger of splitting of the trunk. However, because the blades, of necessity, have a finite thickness, substantial upward thrusts are still applied to the trunk during the final severing operation. In addition, the blades must still cut a substantial portion of the fibers at right angles thereto with resulting high power requirements and some crushing of the wood. Furthermore, a certain degree of usable wood is still left in the stump.

It is a principal object of the present invention to alleviate the disadvantages above and to provide tree shearing apparatus which cuts virtually all of the wood fibers at an oblique angle thereto thus reducing power requirements by improving the shearing action. Upward compression and/or splitting forces on the trunk are very significantly reduced as compared with the prior art devices and provision is made for a major portion of the compressive forces to be transmitted downwardly to the stump. An increased recovery of usable wood may also be realized by virtue of the use of the present invention.

Accordingly, therefore, the present invention relates to tree shearing apparatus including a support means adapted to be positioned adjacent the trunk of a standing tree. The apparatus includes first and second cutter blades each having a cutting edge mounted to the support means, with the cutter blades projecting generally forwardly from the support means. Means are provided for mounting the cutter blades for motion of their cutting edges along curved paths from elevated positions where the cutting edges are spaced from one another to lower positions where the cutting edges are closely adjacent to one another thereby to perform a tree-cutting operation. The apparatus also includes actuating means for effecting the above noted movement of the cutter blades.

The invention is particularly characterized, in one aspect, in that the means for mounting the cutter blades are arranged so that said motion of each cutting edge continually has a downwardly directed component of motion from said elevated position to said lower position.

In a further aspect of the invention, the means mounting the cutter blades are arranged such that the curved paths each lie in a circular arc, said circular arcs intersecting one another in the region of the lower positions of the cutter blades.

In accordance with a further feature of the invention, the cutter blade mounting means includes means defining a pivot axis for each blade. The pivot axes are spaced apart and the cutter blades are arranged relative thereto such that radial lines drawn from the pivot axes to their respectively associated cutting edges intersect one another.

In the preferred form of the invention, the pivot axis defining means are spaced apart in the horizontal direction and the mounting means for the cutter blades are arranged such that the curved path taken by each cutting edge lies to a side of an imaginary vertical plane located mid-way between the spaced-apart pivot axes, which side is opposite to the side of such plane where the pivot axis for such blade is located.

In a further feature of the invention, each blade is arcuately curved and related to the mounting means in such a fashion as to reduce compression and friction forces between the blade surfaces and the cut surface of the tree trunk during the tree-cutting operation. In a preferred form of the invention, the inner surface of each curved blade, i.e., the surface adjacent the tree trunk during the tree-cutting operation, may be arranged such that it moves slightly away from the cut portion of the tree trunk during the cutting operation.

In a further feature of the invention, it is also desirable that the above noted inside surface of the blade be smoothly curved from the leading or cutting edge to the trailing edge thereof. Thus, the bevel on the cutting blade which serves to provide the sharp cutting edge should be located on the outside of the leading edge of the blade, i.e., the surfaces directed towards the stump thereby assisting in transferring the bulk of the fiber compressing forces to the stump.

The principles of the invention will be more clearly understood from the following description, by way of example, of preferred embodiments of the invention wherein reference is made to the drawings wherein:

FIGS. 1 and 2 diagrammatically illustrate the cutting paths taken by shear blades of tree shearing devices according to the prior art;

FIGS. 3 and 4 diagrammatically illustrate the cutting paths taken by shear blades of tree shearing devices to the present invention;

With reference now to the drawings, FIG. 1 diagrammatically illustrates the movement of the shear blades in accordance with the arrangement described in U.S. Pat. No. 3,461,929. It will be seen that the pivot axis for blade A is spaced horizontally from the pivot axis for blade B. It will be seen that the cutting path of blade A is a circular arc extending from point $a$ to point $a'$ while the cutting path for blade B extends from point $b$ to $b'$. However, because of the particular arrangement of the blade pivot points or axes in relation to their associated blades, each blade moves firstly generally downwardly, then somewhat horizontally, and then finally upwardly for a short distance along the last portion of the cutting path. Since both blades move almost horizontally for a substantial distance, many of the wood fibers are sheared at almost right angles thereto thus increasing power requirements as well as the possibility of crushing of the wood fibers. In addition the upward motion of the cutting edges during the final cutting stages tend to transmit splitting forces to the tree trunk. Furthermore, the particular cutting paths utilized leave an appreciable amount of usable wood material in the stump.

In the arrangement shown in FIG. 2, which is representative of the blade motions of the devices shown in U.S. Pat. Nos. 3,817,303 and 3,862,652, it will be seen that blades A B are pivoted about a common axis at the center line of the machine. By virtue of this arrangement, the upward motion of the cutting edges during the final cutting stages is substantially eliminated thus reducing the danger of splitting. However, a substantial proportion of the wood fibers in the tree trunk are cut at right angles thereto with resulting relatively high power requirements for the device and some crushing of the wood. Furthermore, because the blades must have a definite thickness in order to provide adequate strength, substantial upward thrusts are still applied to the tree trunk during the final severing stages. In addition, a certain degree of recoverable wood is still left in the stump.

Figure 3:
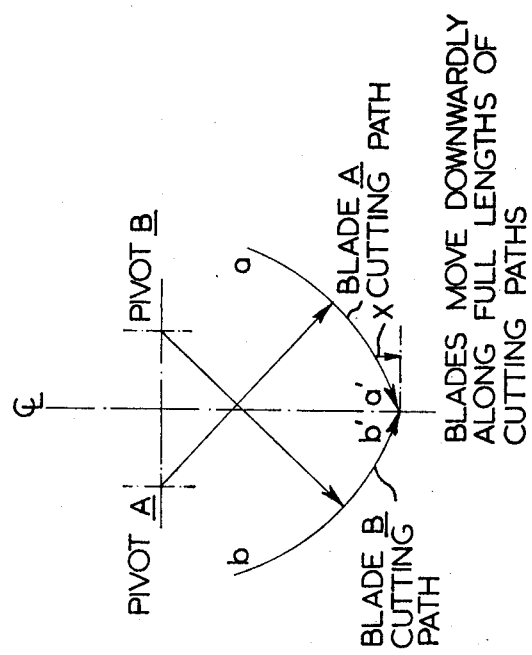

FIG. 3 illustrates the motion of the cutter blades as provided for in accordance with the present invention. It will be seen that blade A is pivoted at pivot point A and moves from an upward position $a$ to a lower position $a'$ while blade B pivoted at point $b$ moves from an upward position $b$ to a lower position $b'$ immediately adjacent point $a'$. The pivot points A and B are spaced horizontally as in the arrangement diagrammatically illustrated in FIG. 1. However, the path of motion of each blade lies wholly to one side of the vertical center line LC opposite to the side on which its associated pivot point is located. In other words, as seen in FIG. 3, pivot A is located on the left side of the vertical center line while the path of travel of its associated blade $a$-$a'$ is entirely on the opposite side of the vertical center line. Pivot point B is located on the opposite side of the center line from pivot point A while the path of travel of blade B, i.e., $b$-$b'$ is located entirely on the opposite side of the vertical center line from pivot B. By virtue of this particular arrangement, the cutting edge of each blade has a downwardly directed component of motion at all times as the blades move from points $a$ and $b$ to points $a'$ and $b'$ respectively. The downwardly directed motion component during the final cutting stages is designated by reference X in FIG. 3.

By virtue of the fact that the cutting edges always have a downwardly directed component of motion as the blades move towards one another from their elevated positions to their lowermost positions, the wood fibers in the tree trunk are always being severed at an oblique angle thereto thus reducing crushing and reducing power requirements. Furthermore, since the blades always have said downwardly directed component of motion, the degree of magnitude of the horizontally directed components is correspondingly reduced and it can readily be determined that a greater degree of recovery of usable wood may be achieved, e.g., it is possible for the cutter blades to, in effect, bite deeper into the stump thus removing more usable wood therefrom.

Figure 4:
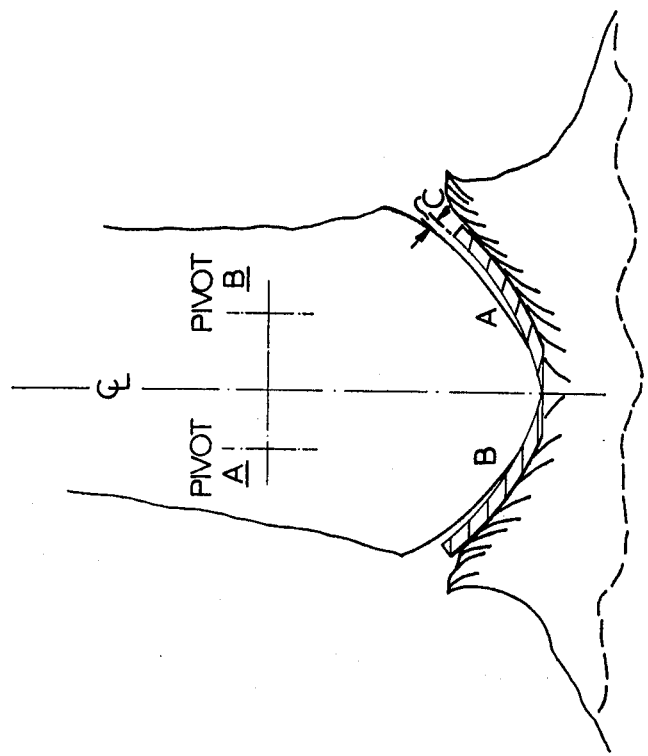

FIG. 4 illustrates the effect of the thickness of the blade on the cutting operation. Since the blades must have a predetermined thickness in order to provide adequate strength, there will, of necessity, be a certain degree of displacement and pushing aside of the fibers of the tree during the cutting operation. However, it is desirable that this displacement take place primarily in the rooted stump. Several different factors must be taken into consideration. Firstly, in order to avoid undue compressive and frictional forces between the inside surface of the blades, i.e., those surfaces facing the tree trunk, such surfaces must not lie inside a radial line drawn from the pivot points of the respective blades. In fact, it is preferable that the inside surface of the blade be arranged such that it diverges slightly outwardly and away from the circular arc defined by the cutting path of the blade such that the inside surface of the blade moves away from the cut portion of the tree trunk and provides a small clearance therebetween as illustrated in FIG. 4. This clearance is illustrated in FIG. 4 by reference C. In addition, since the leading edges of the blades must be bevelled in order to provide the sharp cutting edge, the bevel should be located on the outside of each blade, i.e., on the side which is most closely adjacent the stump during the cutting operation. By virtue of this arrangement, the fibers which are pushed or plowed aside as the blades move through the tree tend to be primarily in the stump.

With reference now to FIGS. 5-8 which illustrate a preferred embodiment of the invention, it will be seen that the tree shearing head designated generally by reference numeral 10 includes a generally upright support post 12, such post being of rectangular cross-section and being hollow thereby to reduce weight. A tree shear assembly 14 is mounted adjacent the lower end of support 12, with a tree grapple arm assembly 16 being mounted to the support 12 above the shearing assembly 14.

The entire shear assembly 10 is adapted to be attached to the body structure or articulated or telescopic boom of a tractor or other universal machine (not shown) in the manner well known in the art thereby to enable the operator to place the tree shearing assembly closely adjacent the trunk of a growing tree and to effect shearing thereof in the manner generally well known in the art. Accordingly, no further description of such conventional equipment for carrying and manipulating the shearing apparatus is deemed necessary.

In order to grasp the tree to be felled and to center it properly relative to the shearing assembly 14, the grapple arm assembly 16 includes a pair of opposed grapple arms 18 of the type generally well known in the art. The grapple arms 18 have curved tree engaging surfaces 20 adapted to closely embrace and securely hold the tree when the arms 18 are in "closed" positions. The grapple arms 18 are securely pivotally connected to the support post 12 by means of connector brackets 22 firmly mounted on support post 12 with associated pivot pins 24 passing through such support brackets and their associated grapple arms 18. The pivot pins 24 define pivot axes for said grapple arms 18 which are generally parallel to the longitudinal axis of support post 12. In order to actuate grapple arms 18, each arm 18 has a hydraulic cylinder 26 associated therewith, each hydraulic cylinder 26 being connected at its one end via bracket 28 and pivot pin 30 to support post 12 with the ram at the opposite end of hydraulic cylinder 26 being pivotally connected to the associated grapple arm 18 via pivot pin 32 as clearly seen in the broken away view of FIG. 8.

In order to further center the tree relative to the shear arrangement 14, the apparatus further includes a support and centering means 36 disposed a short distance above the grapple arm assembly 16. This support and centering means 36 includes a forwardly projecting portion 38 having a generally V-shaped intermediate portion 40 into which a portion of the tree trunk may enter thereby to effect the supporting and centering action referred to above.

The shear apparatus 14 includes an opposed pair of elongated cutter blades 42 and 44, each of the cutter blades 42, 44 having an associated generally sharp cutting edge 42a, 44a associated therewith. Cutter blade 42 has a blade mounting assembly 46 associated therewith and arranged such that blade 42 rotates about the pivot axis defined by shaft 48 while blade 44 has a blade mounting assembly 50 associated therewith and arranged so that blade 44 rotates about the pivot axis as defined by shaft 52. The blade mounting assemblies 46 and 50 are each substantially identical in construction except, of course, for the fact that they are of opposite hand to one another. Thus, only one of them need be described in any detail. Blade mounting assembly 50 includes a front plate 54, an intermediate plate 56 and a rear plate 58. Extending between the rear plate 58 and the center plate 56 is a brace plate 60 the opposite ends of which are firmly welded to the plates 56 and 58. The center and back plates 56 and 58 are further firmly secured together by a further brace plate 62 generally at right angles to the above mentioned brace plate 60. This further brace plate 62 serves to mount a bracket 64 having a pair of spaced upstanding lugs 66 thereon which receive a transverse shaft member 68 to which is connected the ram of a hydraulic cylinder 70. The blade mounting assembly 50 further includes a top brace plate 72 extending between the front plate 54 and the center plate 56. In addition, blade 44 is mounted intermediate the front and center plates 54 and 56 as best seen in FIGS. 5 and 6 and since both plate 72 and blade 44 are securely welded at their opposed ends to said plates, a strong and rigid structure is provided.

Figure 6:
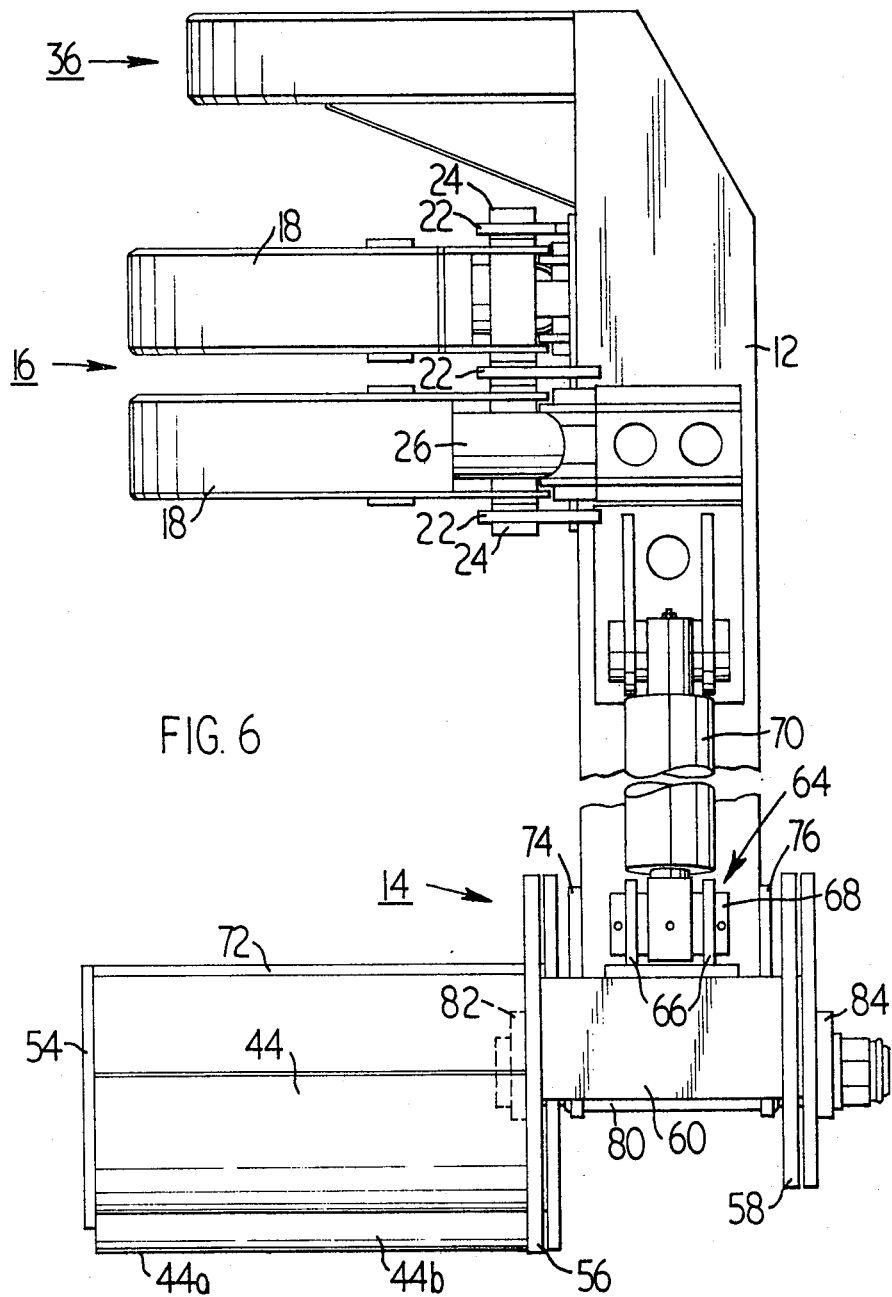
FIG. 6 is a side elevation view of the apparatus shown in FIG. 5.
Figure 7:
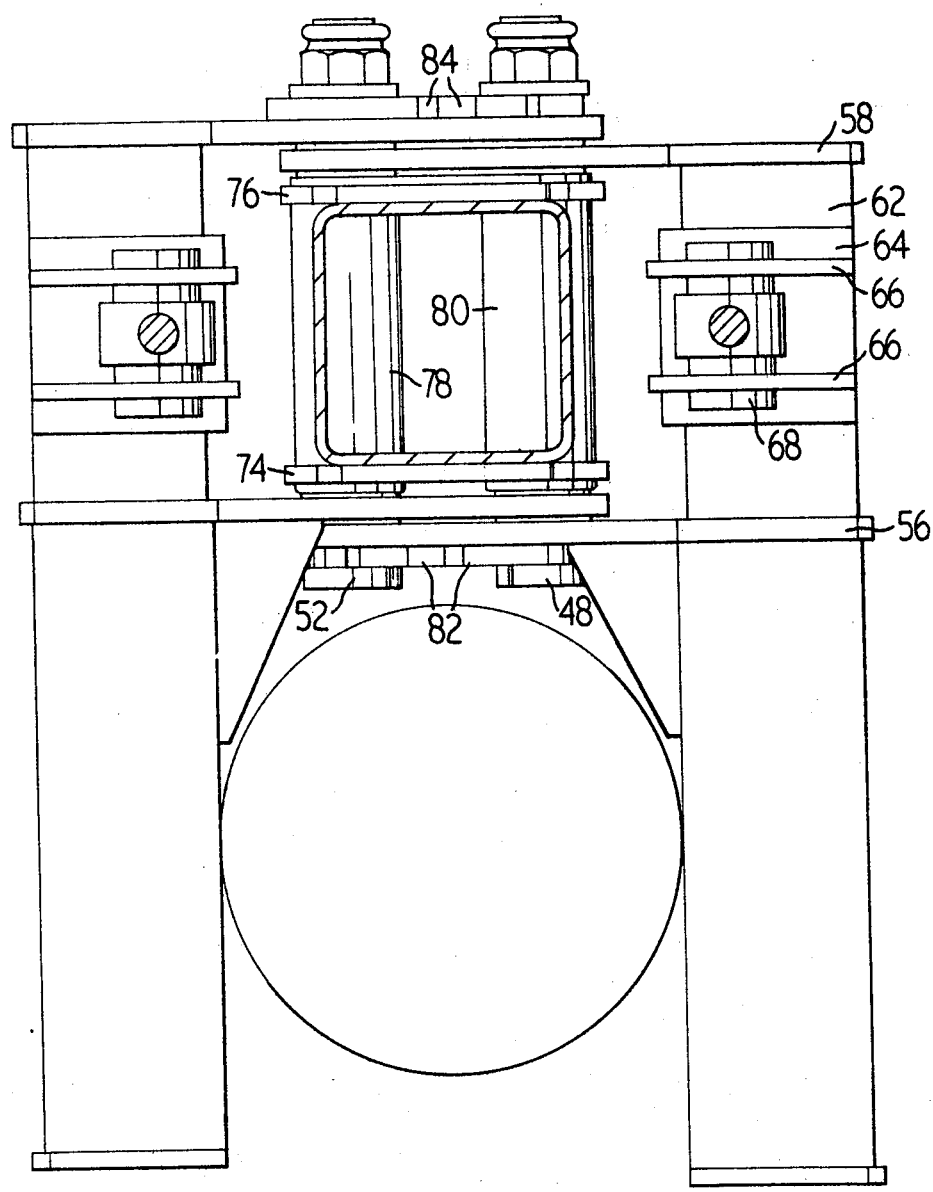
FIG. 7 is a section view taken along line 7—7 in FIG. 5.
Figure 8:
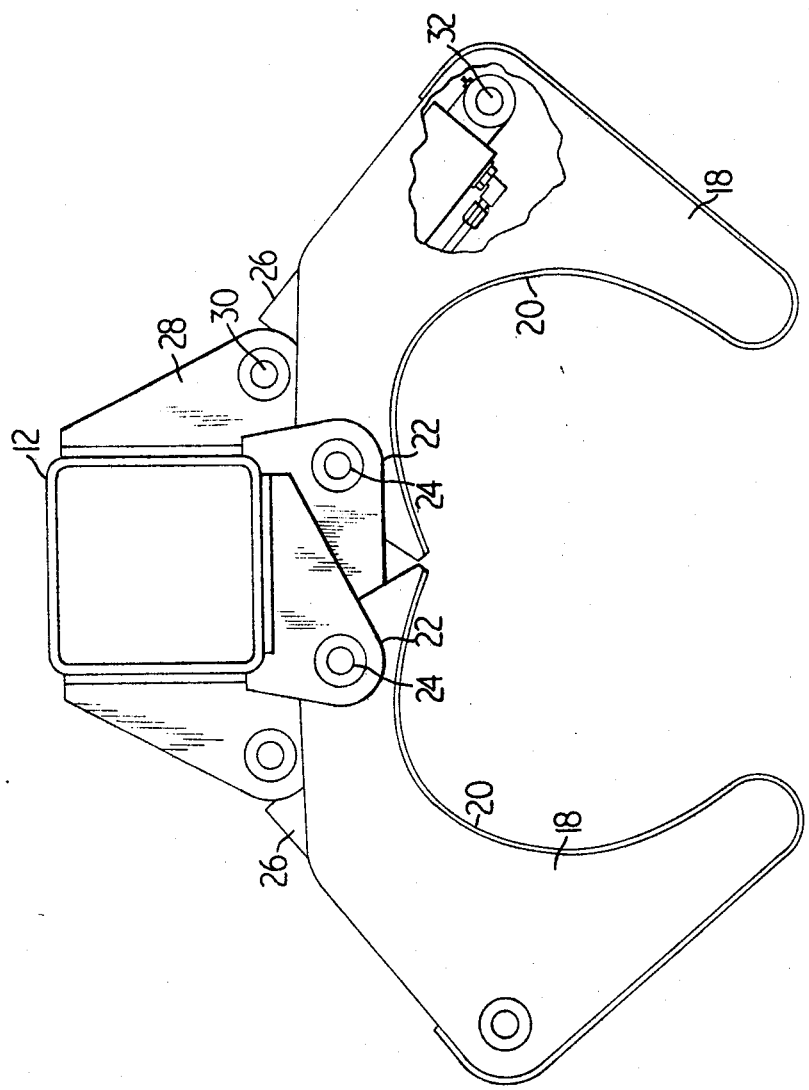
FIG. 8 is a top plan view of the grapple arm arrangement used in the apparatus of the present invention (all structure below the grapple arm assemblies are not shown).

The lower end of support post 12 is provided with a spaced apart pair of gusset plates 74 and 76 securely welded to the front and rear faces of the post, such gusset plates having at the lower ends thereof two spaced apart apertures (not shown) thereby to permit passage therethrough of the above mentioned pivot axles 48 and 52. Extending through these apertures and securely welded to gusset plates 74 and 76 are a pair of tubes 78 and 80 as best seen in FIG. 7. The previously mentioned spaced apart parallel pivot shafts 52 and 48 extend through tubes 78 and 80 and are rotatable relative thereto. With reference to blade mounting assembly 50, the center and rear plates 56 and 58 are suitably keyed to pivot shaft 52 for rotation therewith and, in order to provide for synchronous movement of blades 42 and 44, each of the pivot shafts 52 and 48 have meshing synchronizer gear assemblies 82 and 84 connected thereto as illustrated in FIGS. 5, 6 and 7.

Figure 5:
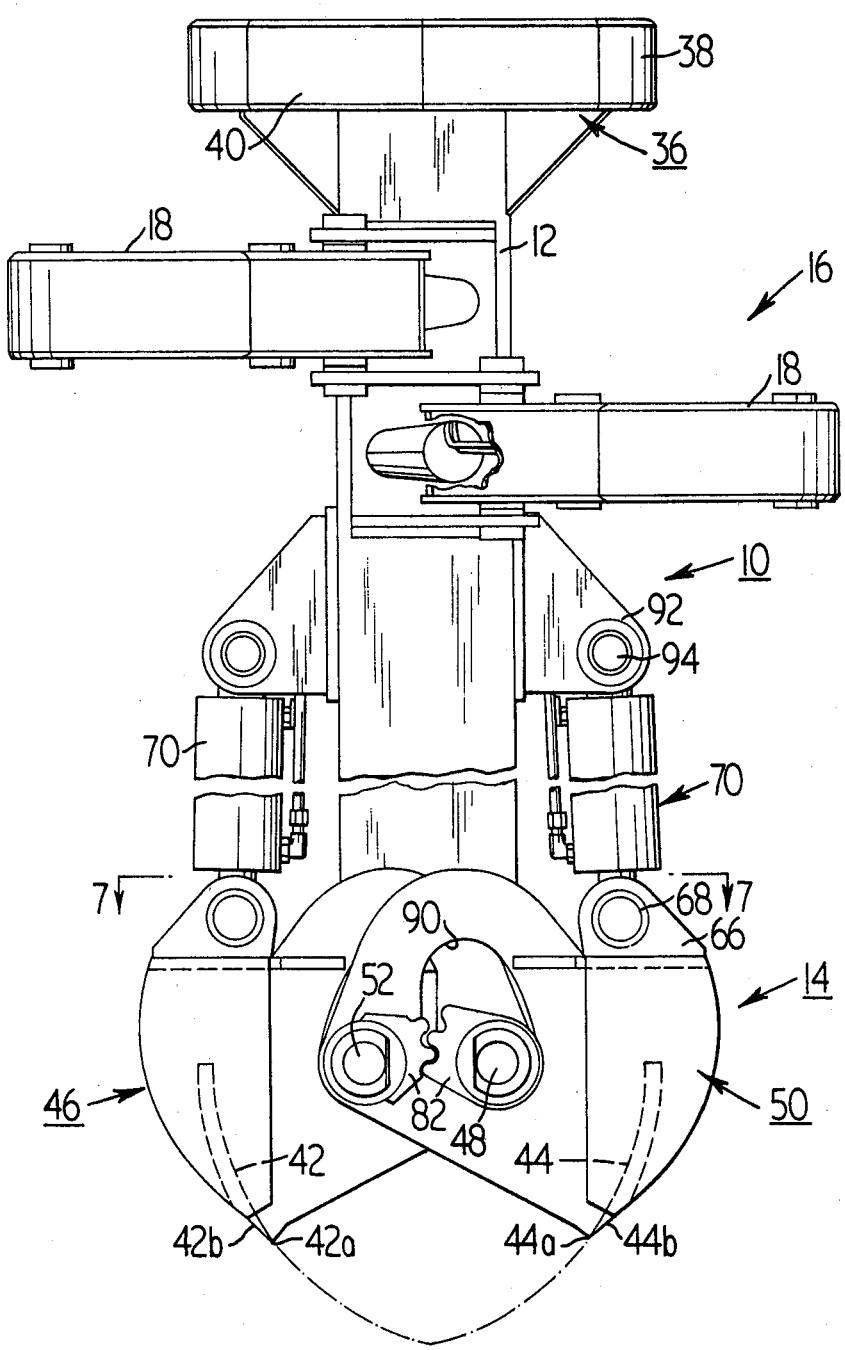
FIG. 5 is a front elevation view of tree shearing apparatus according to the present invention.

Since the center and rear plates 56 and 58 of blade mounting assembly 50 overlap the center and rear plates for blade mounting assembly 46, and since the pivot axle for 48 for blade mounting assembly 46 extends through center and rear plates 56 and 58, each of the latter plates have an arcuate opening 90 therein, the shape of which is best seen in FIG. 5 thereby permitting blade mounting assembly 50 to rotate about the axis defined by shaft 52 without interfering with shaft 48 and its associated assemblies.

The general characteristics of cutter blades 42 and 44 have been described previously. However, in connection with the particular embodiment shown, it is noted that they are of elongated form and have generally straight cutting edges 42a and 44a. The two blades are arcuately curved in cross-section and in the particular arrangement shown, each blade has its inner and outer surfaces arranged to lie in imaginary cylindrical surfaces centered at the pivot axes with which they are respectively associated, i.e., the inner and outer surfaces of blade 42 lie in cylindrical surfaces centered at the pivot axis defined by shaft 48 while the inner and outer surfaces of blade 44 lie in cylindrical surfaces centered at the pivot axis defined by shaft 52. However, as noted previously, it may be advantageous in many cases to modify this shape slightly so that the inner surfaces of the blades move slightly away from the cut portion of the tree butt during the cutting operation. In addition, in order to define the sharp cutting edges 42a and 44a, the blades 42 and 44 include respective bevelled portions 42b and 44b, such bevelled portions lying on the outside of the blade, i.e., that side opposite to the side on which its associated pivot axis is located thereby to reduce the degree of displacement or crushing of the wood fiber on the tree trunk and to transfer as much of the damage to the rooted tree stump.

In order to actuate the cutter blade mounting assemblies 46 and 50, a pair of hydraulic cylinders 70 are provided on opposing sides of the support post 12. The upper ends of the hydraulic cylinders are pivotally connected to support post 12 via suitable bracket means 92 and associated pivot pins 94 while at the opposing ends thereof, the rams of the hydraulic cylinders are pivotally connected to the blade mounting assemblies 46 and 50 by the bracket means 66 and pivot pin means 68 described previously. When the hydraulic cylinders 78 are actuated by supplying hydraulic fluid thereto through suitable valve means (not shown), the blade mounting assemblies 46 and 50 are rotated about their respective pivot axes thus bringing the cutting edges 42a and 44a together along the downwardly and inwardly inclined paths shown by the dashed lines in FIG. 5. As noted above, the synchronizer gears 82, 84 ensure that the two blades move together in unison thus ensuring that the shearing apparatus as a whole remains centered relative to the tree trunk during the shearing operation. The stroke of the hydraulic cylinders 70 is, of course, selected in conjunction with the dimensions of the associated components to ensure that the cutting edges 42a and 44a just barely come together by the time the cylinders 70 reach the end of their travel.

The operation of the tree shearing device according to the invention will be readily apparent to those skilled in the art. The severing apparatus 10, attached to the end of an articulated or telescopic boom (not shown) is made to approach the butt portion of the trunk of a tree to be felled, with the blades 42 and 44 positioned in their upwardly located spaced apart positions. When the tree trunk is closely adjacent the apparatus, the grapple arms 18 are actuated so that the trunk is positioned between the cutting blades 42 and 44 with the grapple arms 18 being thereafter closed to firmly grip the tree and center it relative to the device. Thereafter, the hydraulic cylinders 70 are actuated so as to cause the cutting edges 42a and 44a of blades 42 and 44 respectively to travel along the dashed line paths as illustrated in FIG. 5. After the tree has been severed from the stump, the entire apparatus is manipulated so as to move the tree into a desired position, e.g., onto the skidding bank of a log transporting machine or onto a feed station of a tree delimbing device at which location the butt end of the tree is released from the felling device by retracting the grapple arms 18 and retracting cylinders 70 so as to move the cutting blades 42 and 44 to their spaced apart positions as shown in FIG. 5.

I claim:

1. Tree shearing apparatus comprising: a support means adapted to be positioned adjacent the trunk of a standing tree, first and second cutter blades each having a cutting edge, said cutter blades projecting generally forwardly from the support means, means mounting said cutter blades to said support means for motion of their cutting edges along curved paths from elevated positions where said cutting edges are spaced from one another to lower positions where said edges are in close juxtaposition to one another, and actuating means for effecting said movement of said cutter blades between said elevated positions and said lower positions whereby to perform a tree-trunk shearing operation, characterized in that said means mounting said cutter blades includes a pair of shaft means defining a pivot axis for each said blade, said shaft means being laterally spaced apart and each said cutter blade being mounted to a respective one of the shaft means such that radial lines drawn from said pivot axes to their respectively associated cutting edges intersect one another as said cutting edges are moved between their elevated positions and their lower positions.

2. Tree shearing apparatus according to claim 1 wherein each said blade is arcuately curved and positioned relative to the mounting means in such a fashion that one of the surfaces of each blade moves slightly away from the cut surface of the tree trunk to reduce compression and friction forces between the blade surfaces and the cut surface of the tree trunk during the tree-shearing operation.

3. Tree shearing apparatus according to claim 1 wherein said cutting edge is formed by a bevel on a leading edge of each blade, said bevel being formed on that surface of the blade which faces toward the rooted stump of the tree during the shearing operation.

4. Tree shearing apparatus according to claim 1 further including means for synchronizing the motion of said cutter blades.

5. Tree shearing apparatus according to claim 1 further including grapple arms for engaging and securing the apparatus relative to the tree during the shearing operation.

6. Tree shearing apparatus comprising: a support means adapted to be positioned adjacent the trunk of a standing tree, first and second cutter blades each having a cutting edge, said cutter blades projecting generally forwardly from the support means, means mounting said cutter blades to said support means for motion of their cutting edges along curved paths from elevated positions where said cutting edges are spaced from one another to lower positions where said edges are in close juxtaposition to one another, and actuating means for effecting said movement of said cutter blades between said elevated positions and said lower positions whereby to perform a tree-trunk shearing operation, characterized in that said means mounting said cutter blades include shaft means defining a pivot axis for each cutter blade, the shaft means being spaced apart in the horizontal direction and each of said cutter blades being mounted to a respective one of said shaft means such that the curved path taken by each cutting edge lies to a respective one of the sides of an imaginary vertical plane located mid-way between the spaced apart pivot axes, which side is opposite to the side of such plane where the pivot axis associated with such cutting edge is located.

7. Tree shearing apparatus according to claim 6 wherein each said blade is arcuately curved and positioned relative to the mounting means in such a fashion that one of the surfaces of each blade moves slightly away from the cut surface of the tree trunk to reduce compression and friction forces between the blade surfaces and the cut surface of the tree trunk during the tree-shearing operation.

8. Tree shearing apparatus according to claim 6 wherein said cutting edge is formed by a bevel on a leading edge of each blade, said bevel being formed on that surface of the blade which faces toward the rooted stump of the tree during the shearing operation.

9. Tree shearing apparatus according to claim 6 further including means for synchronizing the motion of said cutter blades.

10. Tree shearing apparatus according to claim 6 further including grapple arms for engaging and securing the apparatus relative to the tree during the shearing operation.

* * * * *